(12) United States Patent
Abdella et al.

(10) Patent No.: US 7,850,137 B2
(45) Date of Patent: Dec. 14, 2010

(54) LATCH SYSTEM FOR AN ADJUSTABLE VEHICLE SEAT

(75) Inventors: David J. Abdella, Royal Oak, MI (US); Ryan Kadlec, Oak Park, MI (US); Scott Kropfreiter, Warren, MI (US); John R. Sims, South Lyon, MI (US); Neil G. Goodbred, Northville, MI (US)

(73) Assignee: Lear Corporation, Southfield, MI (US)

( * ) Notice: Subject to any disclaimer, the term of this patent is extended or adjusted under 35 U.S.C. 154(b) by 690 days.

(21) Appl. No.: 11/678,200

(22) Filed: Feb. 23, 2007

(65) Prior Publication Data

US 2008/0202177 A1    Aug. 28, 2008

(51) Int. Cl.
*F16M 13/00* (2006.01)

(52) U.S. Cl. ............ 248/429; 74/527; 296/65.03; 296/65.14

(58) Field of Classification Search .......... 248/424, 248/423, 429, 430; 74/527; 296/64, 68.1, 296/65.03, 65.14; 297/344.1, 463.1
See application file for complete search history.

(56) References Cited

U.S. PATENT DOCUMENTS

| | | | |
|---|---|---|---|
| 4,109,973 A | | 8/1978 | Terada |
| 4,189,957 A | * | 2/1980 | Gedig et al. .......... 74/535 |
| 4,993,679 A | * | 2/1991 | Urai et al. .......... 248/429 |
| 5,106,144 A | * | 4/1992 | Hayakawa et al. ...... 296/68.1 |
| 5,158,338 A | * | 10/1992 | Hayakawa et al. ...... 297/335 |
| 5,234,189 A | | 8/1993 | Myers |
| 5,564,315 A | * | 10/1996 | Schuler et al. .......... 74/527 |
| 5,816,110 A | | 10/1998 | Schuler et al. |
| 5,913,947 A | * | 6/1999 | Groche .......... 74/527 |
| 5,921,606 A | * | 7/1999 | Moradell et al. ...... 296/65.03 |
| 6,869,057 B2 | | 3/2005 | Matsumoto et al. |
| 6,892,995 B2 | | 5/2005 | Tame et al. |
| 7,082,854 B2 | | 8/2006 | Goodbred et al. |
| 7,207,541 B2 | * | 4/2007 | Frohnhaus et al. ...... 248/429 |
| 2002/0079418 A1 | | 6/2002 | Tame et al. |
| 2004/0182983 A1 | | 9/2004 | Goodbred et al. |
| 2006/0091278 A1 | | 5/2006 | McCulloch et al. |

FOREIGN PATENT DOCUMENTS

| | | |
|---|---|---|
| DE | 2729770 A1 | 1/1979 |
| DE | 10242825 A1 | 6/2003 |
| DE | 102004003144 A1 | 11/2004 |
| FR | 2 907 386 A1 | 4/2008 |

OTHER PUBLICATIONS

English translation of Office Action dated Jul. 24, 2009 from the corresponding Chinese Patent Application No. 200810008311.7, filed Feb. 22, 2008, pp. 1-6.

* cited by examiner

*Primary Examiner*—Gwendolyn Baxter
(74) *Attorney, Agent, or Firm*—Brooks Kushman P.C.

(57) ABSTRACT

A latch system for a vehicle seat track includes locks. The locks are moveable between locked and unlocked positions. The locks lock with a web attached with the seat track.

18 Claims, 4 Drawing Sheets

LATCH SYSTEM FOR AN ADJUSTABLE VEHICLE SEAT

BACKGROUND OF THE INVENTION

1. Field of the Invention

The invention relates to latch systems for adjustable vehicle seats.

2. Discussion

A latch in combination with a track may be used to latch an adjustable vehicle seat.

SUMMARY

Embodiments of the invention may take the form of a positive engagement latch system for an adjustable vehicle seat. The seat includes first and second tracks to position the seat relative to a vehicle. The system includes a bracket associated with the second track. The bracket includes a window to be engaged by an engagement pin. The system also includes a housing attachable with the first track and moveable along the bracket. The system further includes first and second engagement pins associated with the housing and independently moveable between engaged and disengaged positions.

Embodiments of the invention may take the form of a seat track system for an adjustable vehicle seat. The system includes a fixed track attachable with a vehicle and a moveable track attached with the seat and moveable along the fixed track. The system also includes a pin bracket associated with the fixed track. The pin bracket includes a window to be engaged by a pin of a latch assembly. The system further includes a latch assembly attached with the moveable track. The latch assembly includes pins to engage the window. The pins are independently moveable between latched and unlatched positions.

Embodiments of the invention may take the form of an adjustable seat system for a vehicle. The system includes a fixed track attachable with the vehicle and a moveable track attached with the seat and moveable along the fixed track. The system also includes a bracket internal to the fixed and moveable tracks. The bracket includes an opening to be engaged by a pin of a latch assembly. The system further includes a latch assembly attached with the moveable track. The latch assembly includes a pin to engage the opening.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
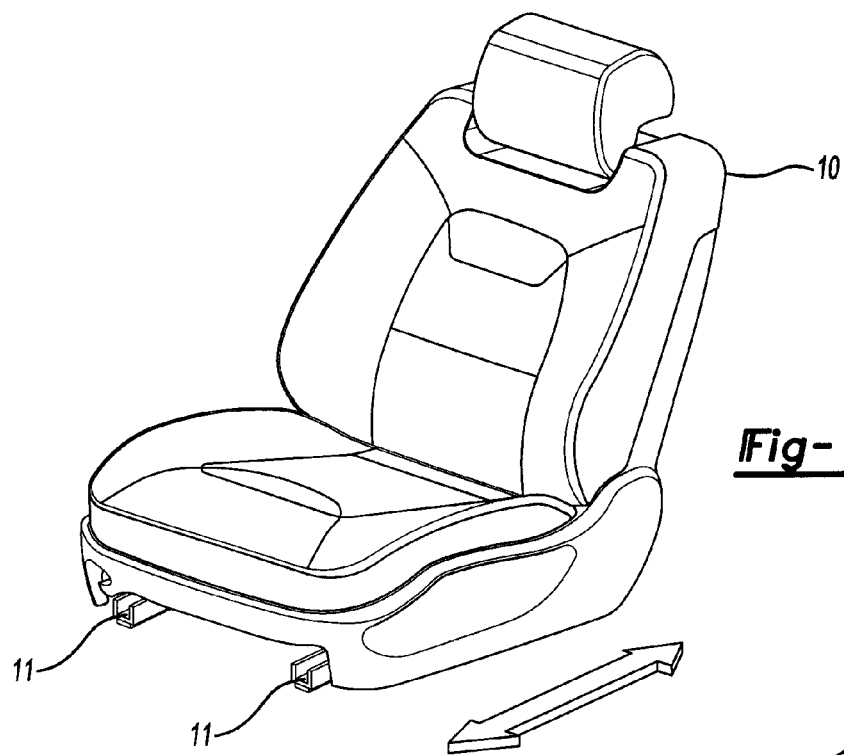
FIG. 1 is a perspective view of a vehicle seat attached with vehicle seat tracks and shows that the vehicle seat may move, as indicated by arrow, via the vehicle seat tracks.

FIG. 1 is a perspective view of vehicle seat 10 attached with vehicle seat tracks 11. Vehicle seat tracks 11 permit vehicle seat 10 to move as indicated by arrow. In the embodiment of FIG. 1, vehicle seat 10 is moved manually. In other embodiments, vehicle seat 10 may be moved automatically.

Figure 2:
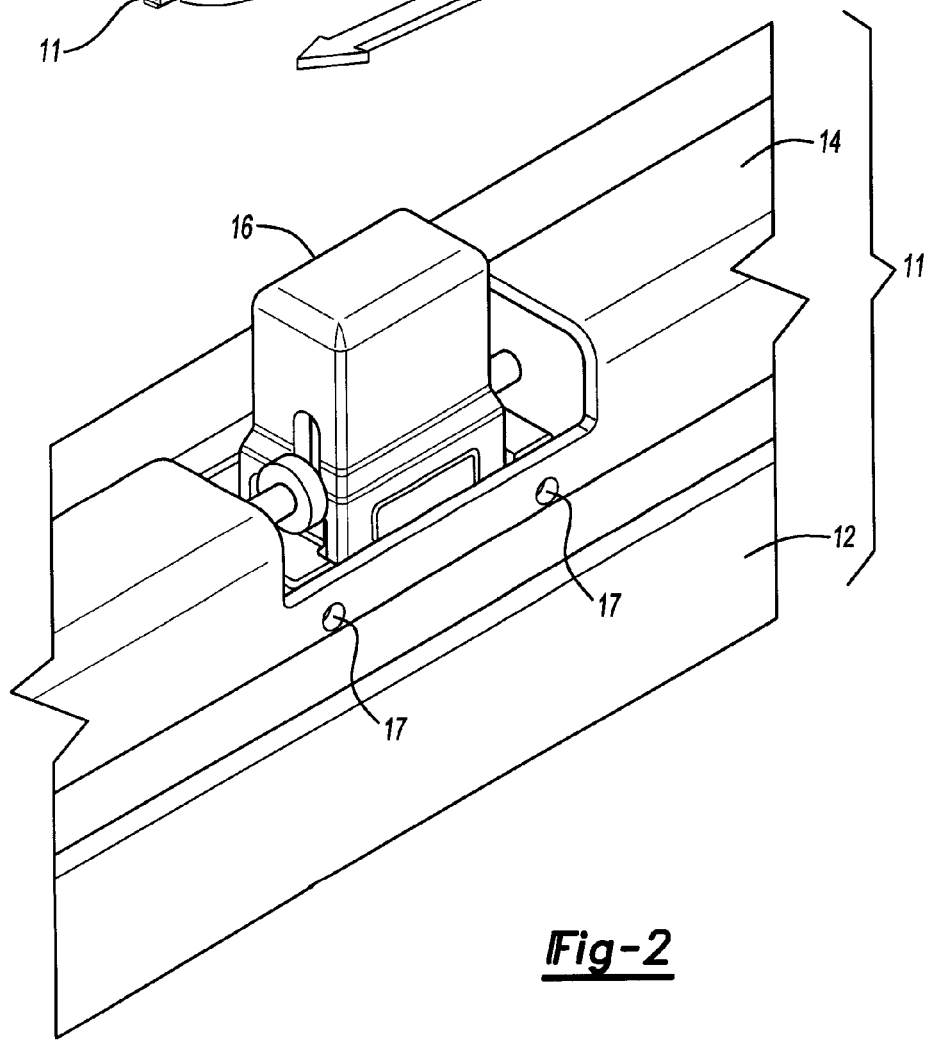
FIG. 2 is a perspective view of a portion of the vehicle seat tracks of FIG. 1 and shows the latch assembly attached with the upper track.

FIG. 2 is a perspective view of a portion of vehicle seat track 11 showing lower track 12 and upper track 14. Lower track 12 may be attached, e.g., bolted, with a vehicle (not shown). Upper track 14 moves along lower track 12. Upper track 14 is attached, e.g., fastened, with vehicle seat 10 such that as upper track 14 moves along lower track 12, vehicle seat 10 moves along lower track 12.

As described below, latch assembly 16 selectively locks upper track 14 in place relative to lower track 12 as upper track 14 moves along lower track 12. Upper track 14 includes through holes 17 which permit latch assembly 16 to be mechanically attached, e.g., pinned, with upper track 14.

Figure 3A:
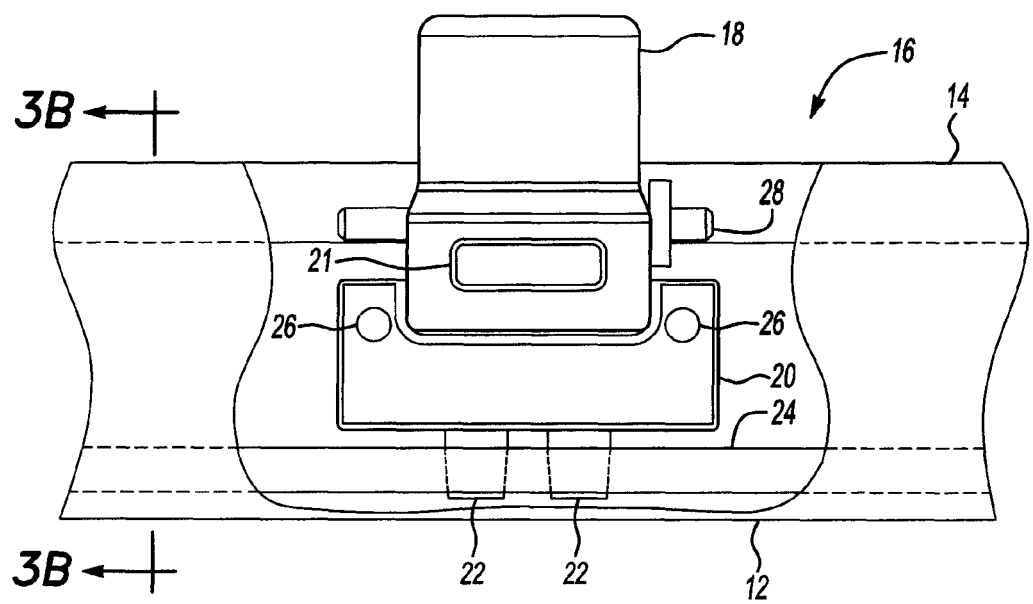
FIG. 3A is a side view, partially broken away, of the latch assembly of FIG. 2 and shows the latch assembly locked with the web.

FIG. 3A is a side view of latch assembly 16 showing latch assembly 16 locked with web 24. Web 24 is attached, e.g., bolted, welded, with lower track 12. Latch assembly 16 includes upper housing 18 and lower housing 20. Upper housing 18 and lower housing 20 snap fit together at snap fit location 21. In alternative embodiments, latch assembly 16 may include a one-piece housing or a multi-piece housing. Lower housing 20 includes lower housing holes 26 which, in combination with upper track holes 17, permit latch assembly 16 to be attached, e.g., bolted, with upper track 14. Latch assembly 16 also includes tapered locks 22 and key pin 28. Locks 22 selectively lock with web 24 as latch assembly 16 and upper track 14 move along lower track 12. Key pin 28 moves locks 22 between locked and unlocked positions. Key pin 28 may be operatively attached with any conventional seat adjust lever system (not shown) such that an occupant may directly or indirectly move the seat lever up (or down depending on the system) to move key pin 28 and thus locks 22 from the locked to the unlocked position. If the occupant holds locks 22 in the unlocked position via the seat lever, the occupant may move seat 10 along lower tracks 12.

Figure 3B:
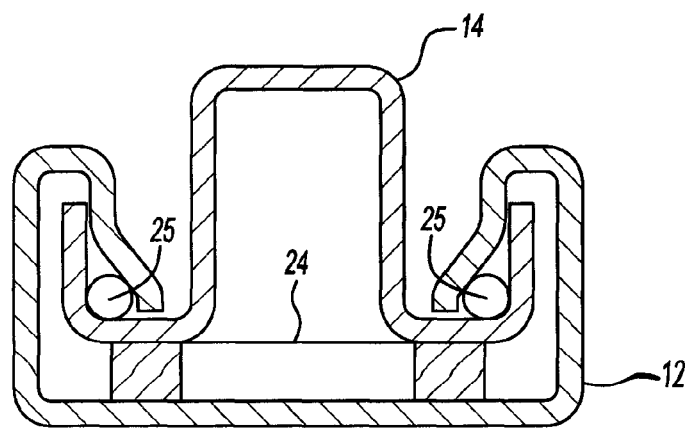
FIG. 3B is a end view, in cross-section, of the lower track, upper track, and web of FIG. 3A taken along section line 3B-3B of FIG. 3A and shows the bearings that facilitate the movement of the upper track relative to the lower track and the web.

FIG. 3B is a end view, in cross-section, of lower track 12, upper track 14, and web 24 taken along section line 3B-3B of FIG. 3A. Bearings 25 facilitate the movement of upper track 14 as it moves relative to lower track 12 and web 24. In alternative embodiments, tracks 12, 14 may have any desired configuration.

Figure 4:
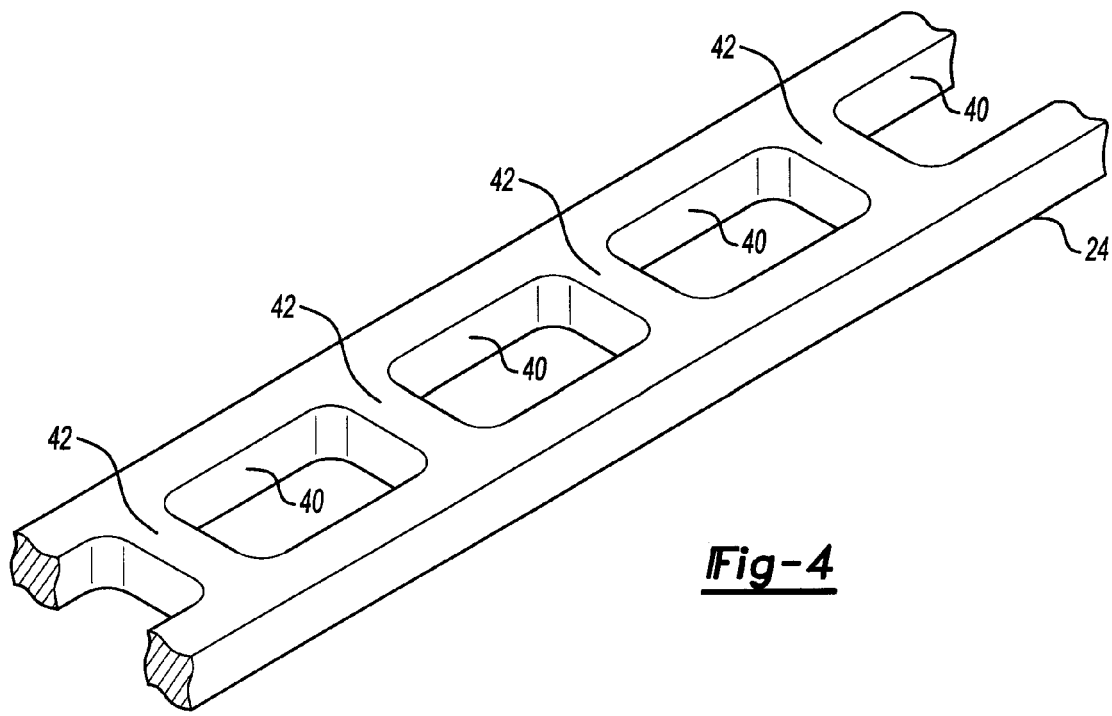
FIG. 4 is a perspective view of a portion of the web of FIGS. 3A and 3B and shows the holes and partitions of the web.

FIG. 4 is a perspective view of a portion of web 24 showing holes 40 and partitions 42. As described below, locks 22 of latch assembly 16 selectively engage portions of web 24 as latch assembly 16 and upper track 14 move relative to lower track 12 and web 24.

Figure 5:
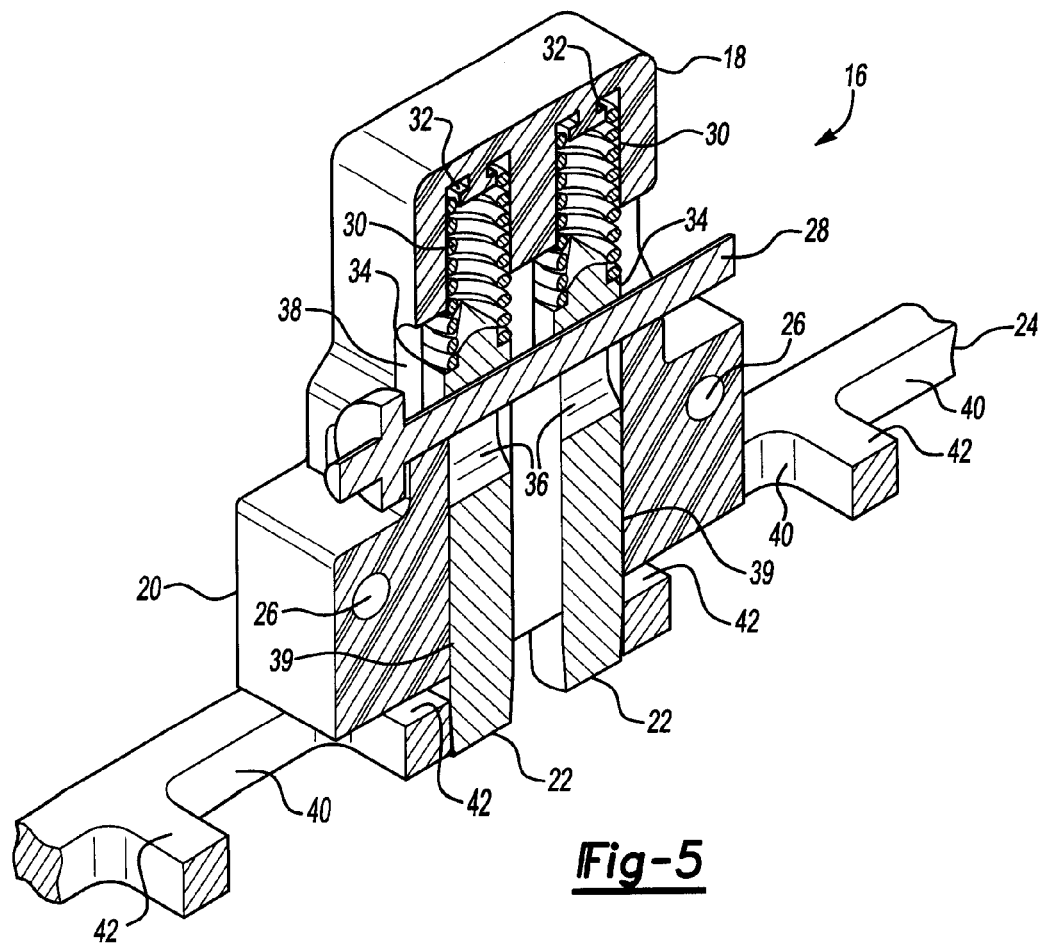
FIG. 5 is a perspective view, in cross-section, of the latch assembly and web of FIG. 3A and shows the internal mechanisms of the latch assembly.

FIG. 5 is a perspective view, in cross-section, of latch assembly 16 and web 24 showing locks 22 in the locked position. Latch assembly 16 includes coil springs 30 which snap to snap features 32 of upper housing 18. Locks 22 include shaped features 34 to receive portions of coil springs 30. As locks 22 move from the locked to the unlocked position, coil springs 30 compress, storing energy for later use in moving the locks from the unlocked to locked position. As locks 22 move from the unlocked to the locked position, coil springs 30 decompress. Locks 22 each include key way 36 which allows key pin 28 to pass through locks 22. As described above, key pin 28 may move up or down in slot 38 thus moving locks 22 between the locked and unlocked positions. Lower housing 20 includes aligning ways 39 that are shaped to align, e.g., limit the horizontal movement of, locks 22 as they move relative to web 24. In alternative embodiments, the housing may be configured differently and some other element, if present, may act to align locks 22.

Figure 6A:
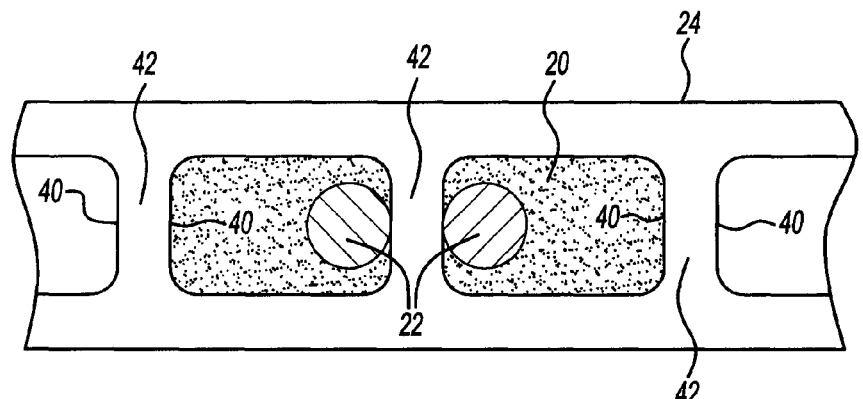
FIG. 6A is a bottom view of the lower housing, locks, and web of FIG. 3A and shows the locks in the locked position and on either side of the partition.

FIG. 6A is a bottom view of lower housing 20, locks 22, and web 24. Locks 22 are in the locked position and are on either side of partition 42. In this position, latch assembly 16 and upper track 14 are not free to move relative to lower track 12. In the embodiment of FIG. 6A, locks 22 have a circular cross-section. In alternative embodiments, locks 22 may have any desired cross-section, e.g., square.

Figure 6B:
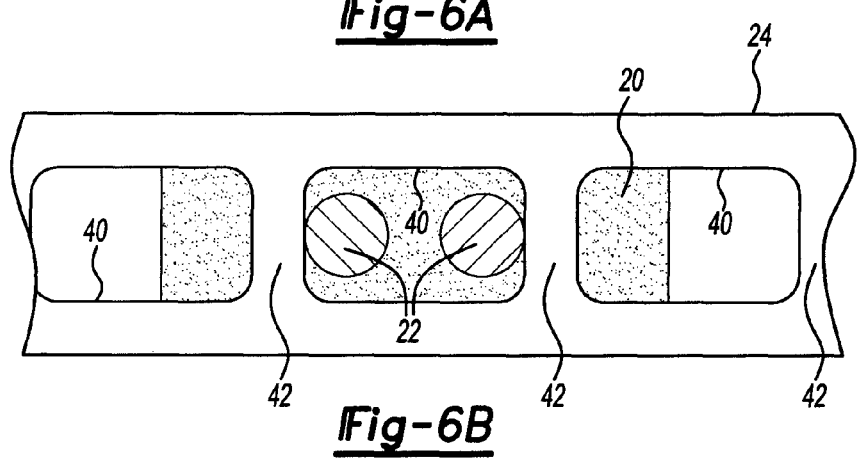
FIG. 6B is a bottom view of the lower housing, locks, and web of FIG. 3A and shows the locks in the locked position, each within the same hole, and each adjacent a partition.

FIG. 6B is a bottom view of lower housing 20, locks 22, and web 24. Locks 22 are in the locked position, each are within the same hole 40, and each are adjacent a partition 42. In this position, latch assembly 16 and upper track 14 are not free to move relative to lower track 12.

Figure 7A:
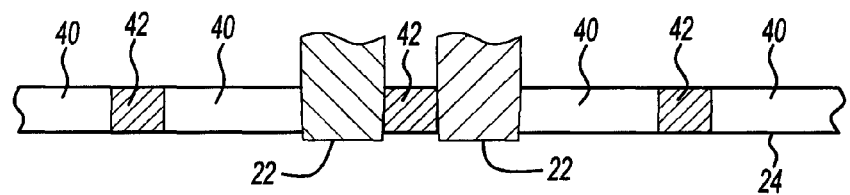
FIG. 7A is a side view, in cross-section, of the locks and web of FIG. 3A and shows the locks in the locked position and on either side of the partition.

FIG. 7A is a side view, in cross-section, of locks 22 and web 24 showing locks 22 in the locked position and on either side of partition 42. In this position, latch assembly and upper track 14 are not free to move relative to lower track 12.

Figure 7B:
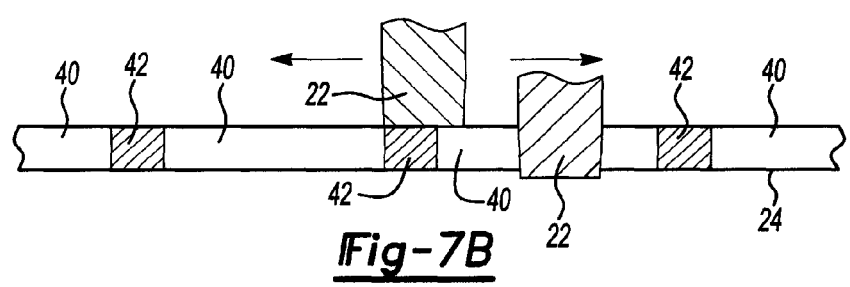
FIG. 7B is a side view, in cross-section, of the locks and web of FIG. 3A and shows one of the locks in the unlocked position and in contact with the partition and the other of the locks in the locked position; and, FIG. 7C is a side view, in cross-section, of the locks and web of FIG. 3A and shows the locks in the locked position and each in contact with a partition.

FIG. 7B is a side view, in cross-section, of locks 22 and web 24 showing one of locks 22 in the unlocked position and in contact with partition 42 and the other of locks 22 in the locked position. In this position, latch assembly 16 and upper track 14 are free to move relative to lower track 14 until lock 22 in the unlocked position drops into the locked position in one of holes 40.

Figure 7C:
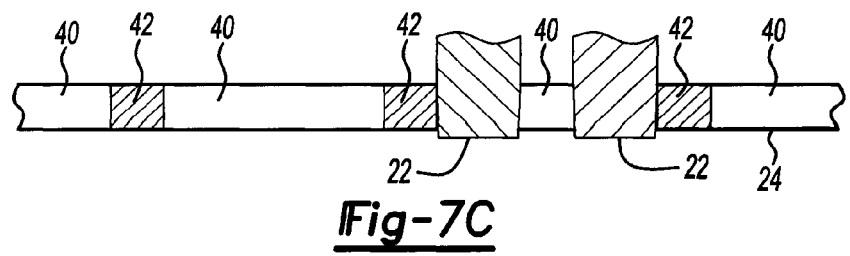

FIG. 7C is a side view, in cross-section, of locks 22 and web 24 showing locks 22 in the locked position and each in contact with a partition 42. In this position, latch assembly and upper track 14 are not free to move relative to lower track 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A positive engagement latch system for an adjustable vehicle seat including first and second tracks to position the seat relative to a vehicle wherein the first track is attached with a bottom of the seat, wherein the second track is attachable with a vehicle, and wherein the first track is moveable along the second track, the system comprising:

a bracket associated with the second track and including a window to be engaged by an engagement pin;

a housing attachable with the first track and moveable along the bracket; and first and second engagement pins associated with the housing, independently moveable between engaged and disengaged positions, and arranged such that both of the engagement pins selectively engage the window at the same time as the housing moves along the bracket to lock the position of the first track relative to the second track.

2. The system of claim 1 wherein the bracket is internal to the first and second tracks.

3. The system of claim 1 further comprising a spring associated with one of the engagement pins and the housing wherein the spring compresses if the one engagement pin moves from the engaged to the disengaged position and relaxes if the one engagement pin moves from the disengaged to the engaged position.

4. The system of claim 3 wherein the spring is attached to the housing.

5. The system of claim 3 wherein the spring comprises a coil spring.

6. The system of claim 5 wherein the one engagement pin includes a contoured end to receive a coil of the coil spring.

7. The system of claim 1 wherein the engagement pins are tapered.

8. The system of claim 1 wherein the engagement pins, if in the engaged position, are internal to the first and second tracks.

9. The system of claim 1 wherein the engagement pins, if in the disengaged position, are internal to the first and second tracks.

10. The system of claim 1 wherein the housing includes throughways to guide the engagement pins as they move between the engaged and disengaged positions.

11. The system of claim 1 wherein the window includes a divider and wherein the engagement pins are further arranged to selectively straddle the divider as the housing moves along the bracket to lock the position of the first track relative to the second track.

12. The system of claim 1 wherein the window includes first and second dividers and wherein the first engagement pin contacts the first divider and the second engagement pin contacts the second divider if both of the engagement pins engage the window at the same time.

13. The system of claim 1 wherein the window includes first and second dividers and wherein the first engagement pin contacts the first divider if the first engagement pin is in the disengaged position and the second engagement pin does not contact the dividers if the second engagement pin is in the engaged position.

14. The system of claim 1 wherein the housing and first track are moveable if the first engagement pin is in the disengaged position and the second engagement pin is in the engaged position.

15. The system of claim 1 further comprising a key configured to move the engagement pins from the engaged to the disengaged position.

16. A seat track system for an adjustable vehicle seat comprising:

a fixed track attachable with a vehicle;

a moveable track attached with the seat and moveable along the fixed track;

a pin bracket associated with the fixed track and including a window to be engaged by a pin of a latch assembly; and a latch assembly attached with the moveable track and including no more than two pins to engage the window, wherein the pins are (i) independently moveable between latched and unlatched positions and (ii) arranged such that the pins selectively engage the window at the same time as the latch assembly moves along the fixed track to lock the position of the moveable track relative to the fixed track.

17. The system of claim 16 wherein the pin bracket is internal to the fixed and moveable tracks.

18. The system of claim 16 wherein the pins are internal to the fixed and moveable tracks.

* * * * *